Nov. 17, 1925.

G. MATTHYSSEN ET AL 1,562,111

HEADLIGHT LENS

Filed March 24, 1924

INVENTORS
George Matthyssen,
Charles Ohlson.
By Hazard and Miller
ATTORNEYS

Patented Nov. 17, 1925.

1,562,111

UNITED STATES PATENT OFFICE.

GEORGE MATTHYSSEN, OF INGLEWOOD, AND CHARLES OHLSON, OF LOS ANGELES, CALIFORNIA.

HEADLIGHT LENS.

Application filed March 24, 1924. Serial No. 701,490.

*To all whom it may concern:*

Be it known that we, GEORGE MATTHYSSEN and CHARLES OHLSON, citizens of the United States, residing at Inglewood and Los Angeles, respectively, in the county of Los Angeles and State of California, have invented new and useful Improvements in Headlight Lenses, of which the following is a specification.

Our invention relates to headlight lenses and consists of the novel features herein shown, described and claimed.

An object of our invention is to make a headlight especially adapted to satisfactorily control the projected rays of light and eliminate the objectionable features caused by the glare of ordinary headlights.

Other objects and advantages will appear from the drawings and specification.

The drawings show the lens mounted with relation to a lamp, a reflector, and a glass.

Figures 1, 2:
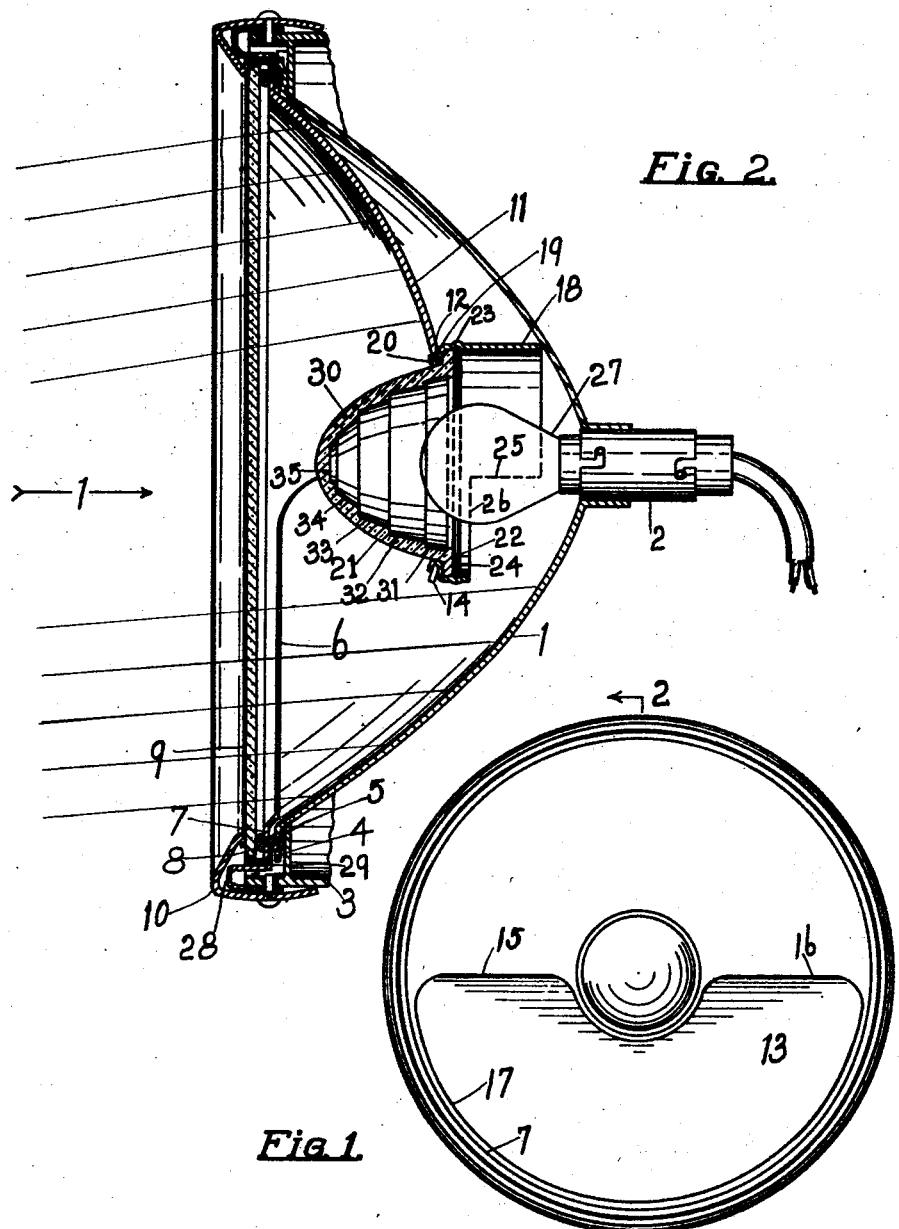
Figure 1 is a front elevation as indicated by the arrow 1 in Fig. 2.
Fig. 2 is an enlarged vertical diametrical sectional detail on the line 2—2 of Fig. 1, and looking in the direction indicated by the arrows.

The details of the headlight lens shown in the drawings are as follows:

A reflector 1 carrying the lamp socket 2 and the housing rim 3 may be of any ordinary construction. The outer part of the reflector 1 forms an attaching rim 4 which is more or less concavo-convex in cross section and a soft packing ring 5 is mounted against this rim.

Our construction 6 consists of a concavo-convex disc having an attaching rim 7, said rim 7 being concave in cross section from its front face and the rim fitting against the packing 5 and there being non-metallic cord packing 8 fitting against the rim 7 so that the glass 9 will fit against the cord, and the usual shell 10 fit against the glass upon the housing 3, so as to make a yielding non-metallic mounting for the lens 6. The portion of the reflector 11 surrounded by the rim 7 is concavo-convex to a considerable less extent than the reflector 1. A circular opening 12 is formed at the axial center of the portion of the reflector 11 and an opening 13 is formed by cutting away the material so as to leave a rim 14 around the opening 12 and cut on lines 15 and 16 in a plane level with the axial center of the headlight, said lines 15 and 16 extending outwardly to the rim 7 and then cutting away the metal on the curved line 17 just inside of the rim 7 so that the opening 13 is equal in extent to substantially one-half of the reflector construction 6. The portion 11 is formed and finished to produce a high grade reflector.

A collar 18 has its forward end reduced to form a shoulder 19 fitting against the back side of the material around the opening 12 and a neck extending through the opening 12 and a flange 20 bent outwardly to clamp the collar in the opening. The beehive glass 21 has a rim 22 and the glass is inserted from the back side through the collar 18 and through the neck of the collar until the flange 22 engages the shoulder 19. The collar 18 has a bead 23 immediately behind the flange 22 and the snap ring 24 fits in the bead 23 against the flange 22 to hold the beehive glass in place. The collar 18 extends from the portion 11 backwardly to the inner face of the reflector 1 and the lower half of the collar is cut away on longitudinal lines 25 and on the circumferential line 26, said line 26 being immediately behind the ring 24, so that when the lamp 27 mounted in the socket 2 is illuminated the upper impervious part of the collar 18 will prevent the rays from the lamp from passing upwardly and outwardly above the horizontal axis of the lamp and the rays of the lamp will be directed into and through the beehive glass 21 and downwardly against the reflector 1 and will be projected forwardly and downwardly so that when the headlight is mounted upon an ordinary car the proper light beam will extend forwardly and hit the ground at from 250 to 300 feet ahead of the headlight.

The annular flange 28 extends forwardly from the edge of the rim 7 and the glass 9 fits loosely within the flange 28. Lugs 29 extend inwardly from the shell 10 behind the rim 7 so as to mount the lens construction in the shell 10 to be removed with the glass 9 and shell 10.

The beehive glass 21 is half an oval when seen in cross section as in Fig. 2, and has a smooth curved outer face 30 and the inner face is rough ground to produce the steps 31, 32, 33, 34 and 35 extending from the flange 22 towards the closed end and center, thereby making the glass translucent, and the lamp 27 extends into the open end of the glass.

The portions of the collar 18 cut away on the lines 25 and 26 must be properly related to the length of the collar from the ring 23 backwardly to the reflector 1 and to the circumference or diameter of the collar. If the reflector 1 is deeper the collar 18 will be longer and the cut away portion will be longer on the lines 25 and the lines 25 will be raised to make the opening wider.

The beehive glass 21 is clear glass with rough ground inner surfaces and the glass 9 is plain flat clear glass. The steps 31, 32, 33, 34 and 35 are beveled or tapered from the flange 22 outwardly with flat shoulders between the steps.

Various changes may be made without departing from the spirit of our invention as claimed.

We claim:

1. A headlight comprising a concavo convex reflector having a rim on its outer edge, an opening in the axial center, and a cut away portion below the axial center adapted to form an opening for rays projected from a lamp, and a beehive glass mounted in the opening of the reflector.

2. A headlight comprising in combination a concavo convex reflector having a circular rim, an opening at its axial center, and a cut away portion below the axial center, a beehive glass mounted in the opening, and a lamp support, the lower portion of which forms a reflector mounted behind the concavo convex reflector.

3. A headlight comprising in combination a concavo convex reflector having a circular rim, an opening at its axial center and a cut away portion below the opening, a beehive glass mounted in the opening, a lamp support having a lamp mounted behind the concavo convex reflector, and having a reflecting surface at its lower portion adapted to reflect the rays from the lamp through the said cut away portion.

4. A headlight comprising an annular rim having a flange, a packing cord against the rim within the flange, a glass within the flange against the packing cord, a shell having a part fitting against the glass in opposition to the packing cord, lugs extending from the shell back of the rim to hold the lens assembled with the glass, a concavo-convex portion within the annular rim formed and finished as a reflector, an opening at the axial center of the concavo-convex portion, a collar mounted in the opening and extending backwardly and having a lower portion cut away, a beehive glass mounted in the forward end of the collar, the material of the concavo-convex portion being cut away to leave a rim around the lower part of the collar and to form an opening for the projection rays, a reflector behind the collar, a lamp socket extending through the reflector, and a lamp in the lamp socket in the forward end of the collar and extending into the beehive glass.

In testimony whereof we have signed our names to this specification.

GEORGE MATTHYSSEN.
CHARLES OHLSON.